United States Patent
Kapusta et al.

(10) Patent No.: US 12,517,229 B2
(45) Date of Patent: Jan. 6, 2026

(54) METHOD OF PROVIDING INTERFERENCE REDUCTION AND A DYNAMIC REGION OF INTEREST IN A LIDAR SYSTEM

(71) Applicant: Analog Devices, Inc., Wilmington, MA (US)

(72) Inventors: Ronald A. Kapusta, Carlisle, MA (US); Andrew William Sparks, Arlington, MA (US); Harvey Weinberg, Sharon, MA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 18/217,366

(22) Filed: Jun. 30, 2023

(65) Prior Publication Data

US 2024/0069172 A1 Feb. 29, 2024

Related U.S. Application Data

(63) Continuation of application No. 16/606,721, filed as application No. PCT/US2017/065392 on Dec. 8,
(Continued)

(51) Int. Cl.
*G01S 7/481* (2006.01)
*G01S 7/48* (2006.01)
(Continued)

(52) U.S. Cl.
CPC .......... *G01S 7/4817* (2013.01); *G01S 7/4808* (2013.01); *G01S 7/483* (2013.01); *G01S 17/58* (2013.01); *G01S 17/89* (2013.01); *G01S 17/931* (2020.01)

(58) Field of Classification Search
CPC ...... G01S 7/4817; G01S 7/4808; G01S 7/483; G01S 17/58; G01S 17/89; G01S 17/931
See application file for complete search history.

(56) References Cited

U.S. PATENT DOCUMENTS

| 5,621,514 A | 4/1997 | Paranto et al. |
| 5,638,164 A | 6/1997 | Landau |

(Continued)

FOREIGN PATENT DOCUMENTS

| CN | 102338872 A | 2/2012 |
| CN | 106461785 A | 2/2017 |

(Continued)

OTHER PUBLICATIONS

U.S. Appl. No. 15/492,771, filed Apr. 20, 2017, Method of Providing a Dynamic Region of Interest in a LIDAR System.
(Continued)

*Primary Examiner* — Aniss Chad
*Assistant Examiner* — Christine Nguyen Huynh
(74) *Attorney, Agent, or Firm* — Schwegman Lundberg & Woessner, P.A.

(57) ABSTRACT

A system and method for providing a dynamic region of interest in a lidar system can include scanning a light beam over a field of view to capture a first lidar image, identifying a first object within the captured first lidar image, selecting a first region of interest within the field of view that contains at least a portion of the identified first object, and capturing a second lidar image, where capturing the second lidar image includes scanning the light beam over the first region of interest at a first spatial sampling resolution, and scanning the light beam over the field of view outside of the first region of interest at a second spatial sampling resolution, wherein the second sampling resolution is different the first spatial sampling resolution.

20 Claims, 7 Drawing Sheets

Related U.S. Application Data 2017, now abandoned, which is a continuation of application No. 15/492,771, filed on Apr. 20, 2017, now abandoned.

(51) Int. Cl.
| | | |
|---|---|---|
| *G01S 7/483* | (2006.01) | |
| *G01S 17/58* | (2006.01) | |
| *G01S 17/89* | (2020.01) | |
| *G01S 17/931* | (2020.01) | |

(56) References Cited

U.S. PATENT DOCUMENTS

| | | | |
|---|---|---|---|
| 9,383,753 B1 * | 7/2016 | Templeton | G05D 1/0246 |
| 10,295,660 B1 * | 5/2019 | McMichael | G02B 7/005 |
| 2006/0227317 A1 | 10/2006 | Henderson et al. | |
| 2010/0045965 A1 | 2/2010 | Meneely | |
| 2013/0050676 A1 | 2/2013 | D'aligny | |
| 2014/0240691 A1 | 8/2014 | Mheen et al. | |
| 2016/0282468 A1 * | 9/2016 | Gruver | G01S 17/93 |
| 2017/0082735 A1 * | 3/2017 | Slobodyanyuk | G01S 17/931 |
| 2017/0219695 A1 | 8/2017 | Hall et al. | |
| 2017/0329010 A1 * | 11/2017 | Warke | G01S 17/10 |
| 2018/0062345 A1 * | 3/2018 | Bills | G01S 7/4815 |
| 2018/0306905 A1 | 10/2018 | Kapusta et al. | |
| 2020/0150228 A1 | 5/2020 | Kapusta et al. | |

FOREIGN PATENT DOCUMENTS

| | | |
|---|---|---|
| CN | 110537108 | 11/2023 |
| EP | 2626722 A1 | 8/2013 |
| WO | WO-2018194721 A1 | 10/2018 |

OTHER PUBLICATIONS

U.S. Appl. No. 16/606,721, filed Oct. 18, 2019, Method of Providing Interference Reduction and a Dynamic Region of Interest in a LIDAR System.
"U.S. Appl. No. 15/492,771, Non Final Office Action mailed Aug. 16, 2019", 9 pgs.
"U.S. Appl. No. 16/606,721, Advisory Action mailed Jun. 2, 2023", 5 pgs.
"U.S. Appl. No. 16/606,721, Final Office Action mailed Feb. 1, 2023", 21 pgs.
"U.S. Appl. No. 16/606,721, Non Final Office Action mailed Aug. 30, 2022", 19 pgs.
"U.S. Appl. No. 16/606,721, Response filed May 1, 2023 to Final Office Action mailed Feb. 1, 2023", 10 pgs.
"U.S. Appl. No. 16/606,721, Response filed Jul. 20, 2022 to Restriction Requirement mailed May 24, 2022", 8 pgs.
"U.S. Appl. No. 16/606,721, Response filed Dec. 22, 2022 to Non Final Office Action mailed Aug. 30, 2022", 11 pgs.
"U.S. Appl. No. 16/606,721, Restriction Requirement mailed May 24, 2022", 6 pgs.
"Chinese Application Serial No. 201780089765.9, Office Action mailed Dec. 1, 2022", 15 pgs.
"German Application Serial No. 112017007467.3, Office Action mailed Jan. 10, 2023", w/English Machine Translation, 17 pgs.
"How modern camera and framegrabber features are changing Machine Vision", Teledyne Dalsa, (Aug. 2015), 30 pgs.
"International Application Serial No. PCT/US2017/065392, International Search Report mailed May 4, 2018", 7 pgs.
"International Application Serial No. PCT/US2017/065392, Invitation to Pay Additional Fees and Partial Search Report mailed Mar. 8, 2018", 11 pgs.
"International Application Serial No. PCT/US2017/065392, Written Opinion mailed May 4, 2018", 8 pgs.
"Multiple Region of Interest (MROI) Imaging", (2017), 3 pgs.
"RobotEye RE08 3D LIDAR: 3D Laser Scanning System", Ocular Robotics, (2015), 6 pgs.
Anderton, Donald C, "Synchronized Line=Scan LIDAR/EO Imager for Creating 3D Images of Dynamic Scenes: Prototype II", All Graduate Plann B and other Reports. Paper 1., (2005), 148 pgs.
Britt, Jordan H, et al., "Lane Detection, Calibration, and Attitude Determination with a Multi-Layer Lidar for Vehical Safety Systems", Thesis submitted to Auburn University, (Dec. 13, 2010), 103 pgs.
Tian, Yi, "Self-Powered Intelligent Traffic Monitoring Using IR Lidar and Camera", Thesis Submitted to Virginia Polytechnic Institute and State University, (Dec. 6, 2016), 106 pgs.
"Chinese Application Serial No. 201780089765.9, Response filed Mar. 8, 2023 to Office Action mailed Dec. 1, 2022", w/English Claims, 14 pgs.
"Chinese Application Serial No. 201780089765.9, Office Action mailed May 19, 2023", 12 pgs.
"German Application Serial No. 112017007467.3, Response filed May 26, 2023 to Office Action mailed Jan. 10, 2023", 50 pgs.

* cited by examiner

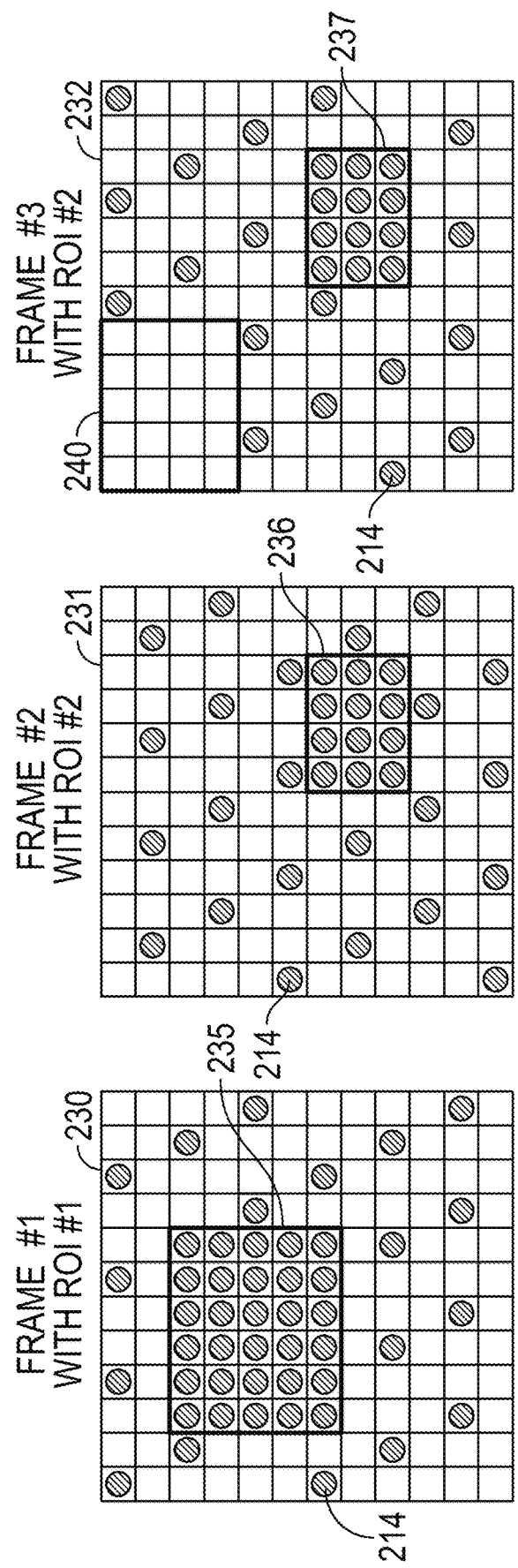

METHOD OF PROVIDING INTERFERENCE REDUCTION AND A DYNAMIC REGION OF INTEREST IN A LIDAR SYSTEM

CROSS REFERENCE TO RELATED APPLICATIONS

This application is a continuation of U.S. Non-Provisional application Ser. No. 16/606,721, filed on Oct. 18, 2019, which is a U.S. National Stage filing under U.S.C. § 371 of International Patent Application Serial No. PCT/US2017/065392, filed Dec. 8, 2017, and published on Oct. 25, 2018, as WO 2018/194721 A1, which claims the benefit of priority from U.S. Non-Provisional patent application Ser. No. 15/492,771, filed on Apr. 20, 2017, the entire disclosure of which are hereby incorporated by reference herein in their entirety.

FIELD OF THE DISCLOSURE

The present disclosure relates to systems and methods for providing reduced interference and a dynamic region of interest in a LIDAR system.

BACKGROUND

Certain lidar systems include a laser that can be discretely scanned over a series of segments in a field of view and a detector that can detect a reflected portion of the discretely scanned laser, such as to provide an image of the field of view. An angular resolution of the lidar system can depend on the number of segments that can be scanned by the laser within the field of view of the lidar system.

SUMMARY OF THE DISCLOSURE

Lidar systems, such as automotive lidar systems, may operate in the presence of multiple neighboring lidar systems. Each of the lidar systems can emit and receive one or more pulses of light, such as to determine a distance to a target within a field of view. An individual lidar system may receive pulses emitted by the other neighboring lidar systems that can interfere with operation of the individual lidar system. During operation, a lidar system can emit a light pulse towards a field of view and receive a light pulse from one or more targets within the field of view.

The time difference between the emitted light pulse and the received light pulse can be used to determine a target distance within the field of view, such as according to the expression $$d = \frac{tc}{2},$$

where d can represent a distance from the lidar system to a target 130, t can represent a round trip travel time, and c can represent a speed of light. However, if the received light pulse originated from a neighboring lidar system, the round trip travel time may be computed incorrectly, such as can lead to an inaccurate target distance determination. The inventors have recognized that it may be possible to add additional information to each of the lidar pulses, such as to allow an individual lidar system to distinguish between pulses received from neighboring lidar systems and pulses corresponding to pulses emitted by the individual lidar system.

In an aspect, the disclosure can feature a method for providing a dynamic region of interest and reduced interference in a lidar system. The method can include scanning a light beam over a field of view, such as to capture a first lidar image and selecting a first region of interest within the field of view. The method can also include scanning the light beam over the first region of interest, such as to capture a second lidar image. The method can also include randomly or pseudo-randomly varying a parameter associated with the capturing of the first or second lidar images. The varying can produce a signature, such as to characterize an identity of the lidar system that produced the light beam. Randomly or pseudo-randomly varying the parameter can include introducing a randomly or pseudo-randomly varying time delay before capturing the first lidar image. Randomly or pseudo-randomly varying the parameter can include introducing a randomly or pseudo-randomly varying time delay before capturing the second lidar image. Randomly or pseudo-randomly varying the parameter can include repeatedly capturing the second lidar image and introducing a randomly or pseudo-randomly varying time delay before a capture of the second lidar images. Randomly or pseudo-randomly varying the parameter can include randomly or pseudo-randomly scanning the light beam over the first region of interest, such as to capture the second lidar image. Randomly or pseudo-randomly varying the parameter comprises randomly or pseudo-randomly scanning the light beam over the field of view, such as to capture the first lidar image. A spatial sampling resolution in the second lidar image can be different than a spatial sampling resolution in the first lidar image. The method can also include verifying, such as by using the signature, that the received light pulses from a target within the field of view were issued by the same lidar system. The method can also include using verified light pulses, such as to determine a distance from the lidar system to a target within the field of view. The method can also include rejecting, such as by using the signature, received light pulses from a target within the field of view that were not issued by the same lidar system.

In an aspect, the disclosure can feature a lidar system for providing a dynamic region of interest and reduced interference in a lidar system. The system can include a scanning element configured to scan a light beam over a field of view, such as to capture a first lidar image. The system can also include control circuitry that can be configured to (i) select a first region of interest within the field of view; (ii) instruct the scanning element to scan the light beam over the first region of interest, such as to capture a second lidar image; and (iii) randomly or pseudo-randomly vary a parameter associated with the capturing of the first or second lidar images. The varying can produce a signature to characterize an identity of the lidar system that produced the light beam. The control circuitry can be configured to introduce a randomly or pseudo-randomly varying time delay before capturing the first lidar image. The control circuitry can be configured to introduce a randomly or pseudo-randomly varying time delay before capturing the second lidar image. The control circuitry can be configured to instruct the scanning element to repeatedly capture the second lidar image and introduce a randomly or pseudo-randomly varying time delay before a capture of the second lidar images. The control circuitry can be configured to instruct the scanning element to randomly or pseudo-randomly scan the light beam over the first region of interest, such as to capture the second lidar image. The control circuitry can be configured to instruct the scanning element to randomly or pseudo-randomly scan the light beam over the field of view, such as to capture the first lidar image. A spatial sampling resolution in the second lidar image can be different than a spatial sampling resolution in the first lidar image. The control circuitry can be configured to verify, using the signature, that the received light pulses from within the field of view were issued by the same lidar system. The control circuitry can also be configured to use verified light pulses, such as to determine a distance from the lidar system to a target within the field of view. The control circuitry can be configured to reject, using the signature, received light pulses from within the field of view that were not issued by the same lidar system.

In an aspect, the disclosure can feature a lidar system for providing a dynamic region of interest and reduced interference in a lidar system. The system can include a means for scanning a light beam over a field of view (e.g., illuminator 105, control circuitry 104, and scanning element 106 as illustrated in FIG. 1), such as to capture a first lidar image and selecting a first region of interest within the field of view. The system can also include a means for scanning the light beam over the first region of interest (e.g., illuminator 105, control circuitry 104, and scanning element 106 as illustrated in FIG. 1), such as to capture a second lidar image. The system can also include a means for randomly or pseudo-randomly varying a parameter associated with the capturing of the first or second lidar images (e.g., control circuitry 104 as illustrated in FIG. 1), the varying producing a signature to characterize an identity of the lidar system that produced the light beam. The system can also include a means for verifying (e.g., control circuitry 104 and detection circuitry 124 as illustrated in FIG. 1), using the signature, that the received light pulses from a target within the field of view were issued by the same lidar system. The system can also include a means for using verified light pulses to determine a distance from the lidar system to a target within the field of view (e.g., control circuitry 104 as illustrated in FIG. 1).

In an aspect, the disclosure can feature a system for providing a dynamic field of view in a lidar system. The system can include a scanning element that can be configured to scan a light beam over a field of view, such as to capture a first lidar image. The system can also include control circuitry that can be configured to select a first region of interest within the field of view and instruct the scanning element to scan the light beam over the first region of interest, such as to capture a second lidar image. The system can also include an inertial sensor that can be configured to provide an indication of an acceleration or a rotation of the lidar system. The control circuitry can be configured to adjust the field of view of the lidar system or the first region of interest within the field of view in response to the indication of the acceleration of rotation of the lidar system. The inertial sensor can provide an indication of a change in orientation of the lidar system and the control circuitry can be configured to adjust the field of view of the lidar system or the first region of interest within the field of view in response to the indication of the change in orientation of the lidar system. The change in orientation of the lidar system can include a pitch or yaw of the lidar system. The inertial sensor can provide an indication of static misalignment of the lidar system with a host vehicle and the control circuitry can be configured to adjust the field of view of the lidar system or the first region of interest within the field of view in response to the indication of the static misalignment of the lidar system. The inertial sensor can provide an indication of dynamic vehicle motion and the control circuitry can be configured to adjust the field of view of the lidar system or the first region of interest within the field of view in response to the indication of the dynamic vehicle motion.

BRIEF DESCRIPTION OF THE DRAWINGS

The present disclosure will now be described, by way of example, with reference to the accompanying drawings, in which:

FIGS. 2A-2C illustrate an example of a sequence of frames in a lidar system.

DETAILED DESCRIPTION OF EMBODIMENTS OF THE DISCLOSURE

Figure 1A:
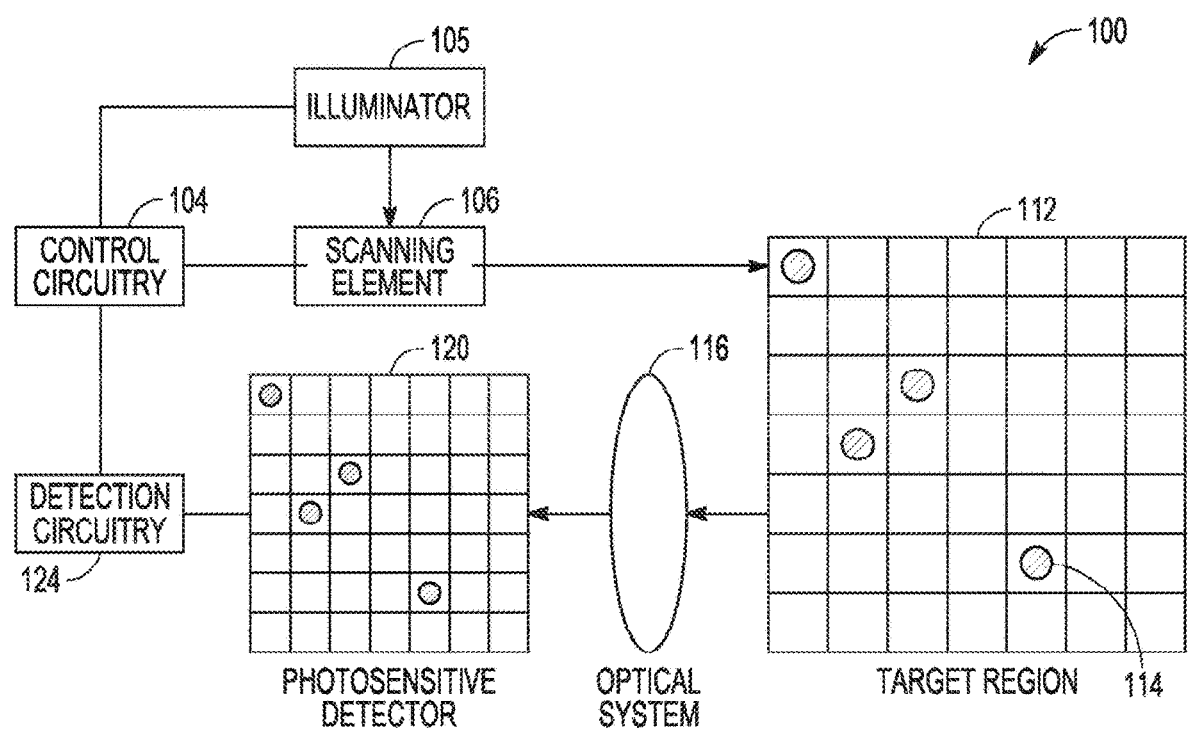
FIG. 1A illustrates a diagram of a lidar system.

FIG. 1A shows an example of a lidar system 100. The lidar system 100 can include control circuitry 104, an illuminator 105, a scanning element 106, an optical system 116, a photosensitive detector 120, and detection circuitry 124. The control circuitry 104 can be connected to the illuminator 105, the scanning element 106 and the detection circuitry 124. The photosensitive detector 120 can be connected to the detection circuitry 124. During operation, the control circuitry 104 can provide instructions to the illuminator 105 and the scanning element 106, such as to cause the illuminator 105 to emit a light beam towards the scanning element 106 and to cause the scanning element 106 to direct the light beam towards the target region 112. In an example, the illuminator 105 can include a laser and the scanning element can include a vector scanner, such as an electro-optic waveguide. The electro-optic waveguide can adjust an angle of the light beam based on the received instructions from the control circuitry 104. The target region 112 can correspond to a field of view of the optical system 116. The electro-optic waveguide can scan the light beam over the target region 112 in a series of scanned segments 114. The optical system 116 can receive at least a portion of the light beam from the target region 112 and can image the scanned segments 114 onto the photosensitive detector 120 (e.g., a CCD). The detection circuitry 124 can receive and process the image of the scanned points from the photosensitive detector 120, such as to form a frame. In an example, the control circuitry 104 can select a region of interest that is a subset of the field of view of the optical system and instruct the electro-optic waveguide to scan over the region of interest. In an example, the detection circuitry 124 can include circuitry for digitizing the received image. In an example, the lidar system 100 can be installed in an automobile, such as to facilitate an autonomous self-driving automobile.

Figure 1B:
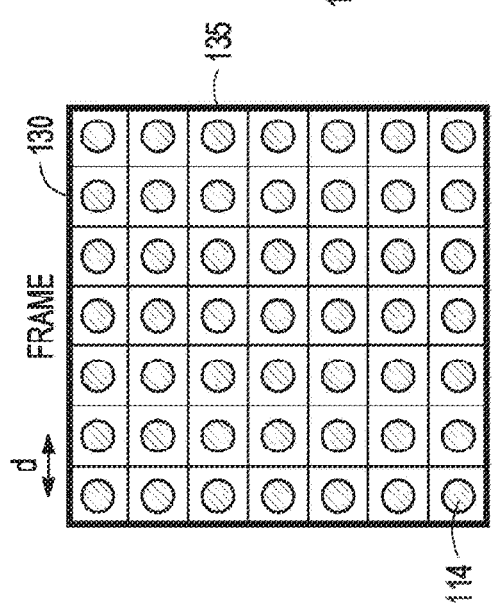
FIGS. 1B-1G illustrate examples of a frame in a lidar system.

FIG. 1B illustrates an example of a frame 130 corresponding to a 2D image, such as that captured with lidar system 100. The frame can correspond to a field of view of the optical system 116. The frame 130 can include a collection of scanned segments 114. The scanned segments 114 can be regularly spaced by a distance d, along a grid. The spacing d of the scanned segments 114 can determine the angular resolution of a lidar system, such as the lidar system 100. For example, a larger spacing can correspond to a coarser angular resolution and a smaller spacing can correspond to a finer angular resolution. In an example, the frame 130 can include a region of interest 135 that corresponds to a field of view of the optical system 116 (e.g., all points within the field of view can be scanned).

Figure 1C:
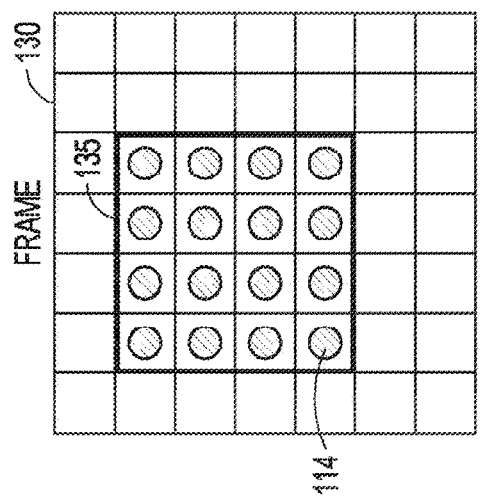

FIG. 1C illustrates an example of a frame 130, such as that captured with lidar system 100. The frame can correspond to a field of view of the optical system 116. The frame 130 can include a collection of scanned segments 114. The scanned segments 114 can be regularly spaced along a grid. The spacing of the scanned segments 114 can determine the angular resolution of a lidar system, such as the lidar system 100. For example, a larger spacing can correspond to a coarser angular resolution and a smaller spacing can correspond to a finer angular resolution. In an example, the frame 130 can include a region of interest 135 that corresponds to a subset of a field of view of the optical system 116. In an example, the scanning element 106 scan a light beam over the region of interest 135, but not other points within the field of view of the lidar system 100 (e.g., only a fraction of points within the field of view can be scanned).

Figure 1D:
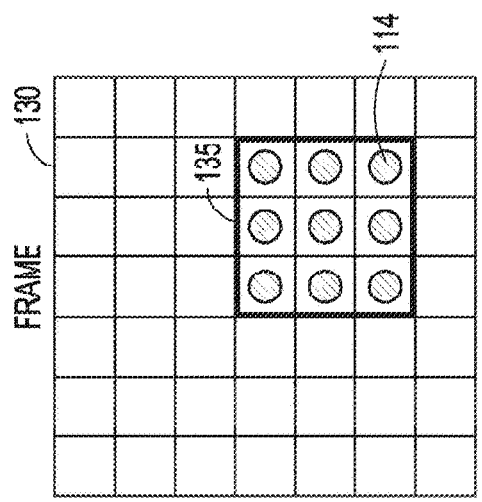

FIG. 1D illustrates an example of a frame 130, such as that captured with lidar system 100. The frame can correspond to a field of view of the optical system 116. The frame 130 can include a collection of scanned segments 114. The scanned segments 114 can be regularly spaced along a grid. The spacing of the scanned segments 114 can determine the angular resolution of a lidar system, such as the lidar system 100. For example, a larger spacing can correspond to a coarser angular resolution and a smaller spacing can correspond to a finer angular resolution. In an example, the frame 130 can include a region of interest 135 that corresponds to a subset of a field of view of the optical system 116. In an example, the scanning element 106 scan a light beam over the region of interest 135, but not other points within the field of view of the lidar system 100 (e.g., only a fraction of points within the field of view can be scanned).

Figure 1G:
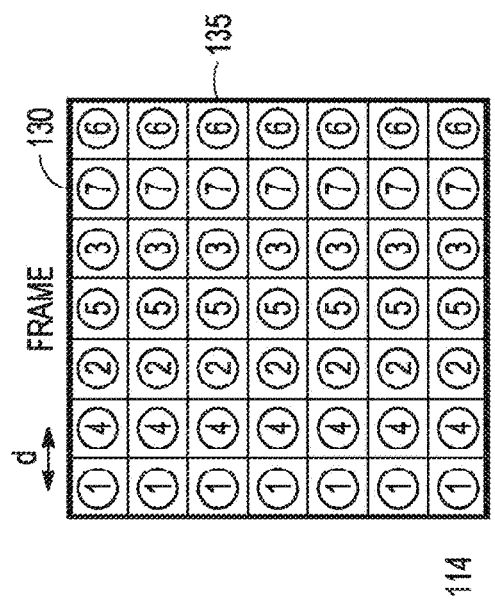
Figure 1F:
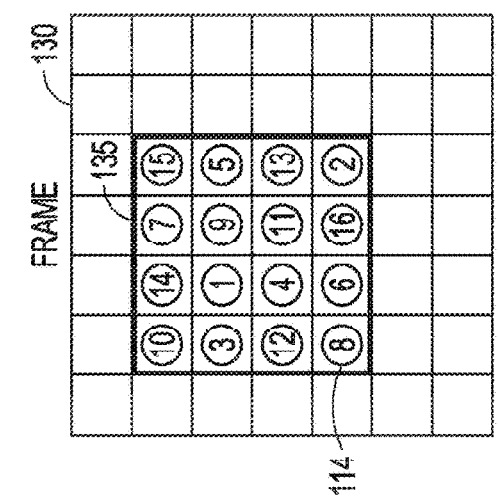
Figure 1E:
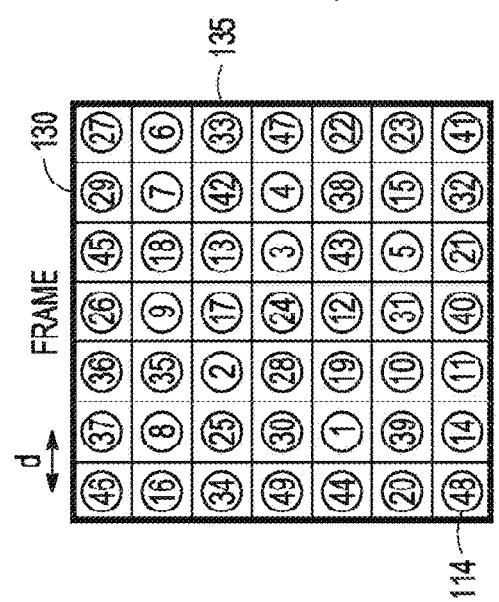

FIG. 1E illustrates an example where the segments 114 in a frame corresponding to a field of view can be illuminated by the illuminator 105 and the scanning element 106 in a random or pseudo-random order, such as to reduce the effects of interference from light beams originating from other lidar systems. In the example illustrated in FIG. 1E, the numbering of the segments 114 indicates an order in which the segments can be illuminated by the lidar system 100. For example, the segment labelled "1" can correspond to first segment illuminated by the lidar system 100, the segment labelled "2" can correspond to the second segment illuminated by the lidar system 100, and in general, the segment labelled "m" can correspond to the "nth" segment illuminated by the lidar system 100.

Additionally, the control circuitry 104 can insert a random or pseudo-random time delay between successive transmissions of the light beam, such as to reduce the effects of interference from light beams originating from other lidar systems.

In an example illustrated in FIG. 1F, the frame 130 can include a region of interest 135 that corresponds to a subset of a field of view of the optical system 116. In an example, the scanning element 106 scan a light beam over the region of interest 135, but not other points within the field of view of the lidar system 100 (e.g., only a fraction of points within the field of view can be scanned). Similar to FIG. 1E, the segments 114 can be scanned in a random or pseudo-random order, such as to reduce the effects of interference from light beams originating from other lidar systems. Also similar to FIG. 1E, the control circuitry 104 can insert a random or pseudo-random time delay between successive transmissions of the light beam, such as to reduce the effects of interference from light beams originating from other lidar systems.

FIG. 1G illustrates an example where columns of segments 114 in a frame corresponding to a field of view can be illuminated by the illuminator 105 and the scanning element 106 in a random or pseudo-random order, such as to reduce the effects of interference from light beams originating from other lidar systems. In the example illustrated in FIG. 1G, the numbering of the columns of segments 114 indicates an order in which the columns of segments can be illuminated by the lidar system 100. For example, the column labelled "1" can be illuminated first, the column labelled "2" can be illuminated second, and in general, the column of segments labelled "m" can be the $m^{th}$ illuminated column of segments. Although columns of segments have been shown in the example illustrated in FIG. 1G, other patterns of segments, such as rows of segments are also possible. Additionally, the control circuitry 104 can insert a random or pseudo-random time delay between successive transmissions of the light beam, such as to reduce the effects of interference from light beams originating from other lidar systems.

FIGS. 2A-2C illustrate an example of a sequence of frames 230-232 where the scanned points can be irregularly spaced across a field of view of the optical system 116. The first frame 230 as illustrated in FIG. 2A can include a first region of interest 235. The first region of interest 235 can include a collection of regularly spaced scanned points. The scanned points in the first region of interest 235 can correspond to a first angular resolution. Outside of the first region of interest 235, the scanned points can be regularly spaced with a larger spacing than the first region of interest 235, corresponding to a coarser angular resolution than in the first region of interest 235. Outside of the first region of interest 235, every third column in every other row can be scanned as illustrated in FIG. 2A. However, other patterns of scanning can be utilized outside of the first region of interest 235. For example, a scanning pattern outside of the first region of interest can include every second column, in every third row. More generally, the scanning pattern outside of the first region of interest 235 can include every $n^{th}$ column in every $m^{th}$ row. The first region of interest 235 can be dynamically adjusted on a frame-to-frame basis, such as based on an analysis of the frame by the detection circuitry 124. In the example shown in FIG. 2A, the first frame can accommodate up to 144 scanned points, the first region of interest 235 can include 36 scanned points, and the portion of the frame outside of the region of interest can include 17 scanned points, for a total of 53 scanned points out of a total of 144 possible scanned points. The second frame 231 as illustrated in FIG. 2B can include a second region of interest 236. The second region of interest 236 can be determined based on an object detected in the first frame 230. The second region of interest 236 can be smaller than the first region of interest 235 and can include a collection of regularly spaced scanned points. The scanned points in the second region of interest 236 can correspond to a first angular resolution. Outside of the second region of interest 236, the scanned points can be regularly spaced with a larger spacing than the second region of interest 236, corresponding to a coarser angular resolution than in the second region of interest 236. The second region of interest 236 can be dynamically adjusted on a frame-to-frame basis, such as based on an analysis of the first frame 230 by the detection circuitry 124. In an example where the second region of interest 236 can be smaller than a first region of interest 235, a total number of scanned points in the frame 231 can be smaller than the total number of scanned points in the frame 230. In the example shown in FIG. 2B, the second frame can accommodate up to 144 scanned points, the second region of interest 236 can include 12 scanned points, and the portion of the frame outside of the region of interest can include 23 scanned points, for a total of 45 scanned points out of a total of 144 possible scanned points. The third frame 232 as illustrated in FIG. 2C can include a third region of interest 237 and a region of disinterest 240. The third region of interest 237 can be determined based on an object detected in the second frame 231. The third region of interest 237 can be the same size as the second region of interest 236 and can include a collection of regularly spaced scanned points. The scanned points in the third region of interest 237 can correspond to a first angular resolution. Outside of the third region of interest 237, the scanned points can be regularly spaced with a larger spacing than the third region of interest 237, corresponding to a coarser angular resolution than in the third region of interest 237. The third region of interest 237 can be dynamically adjusted on a frame-to-frame basis, such as based on an analysis of the second frame 231 by the detection circuitry 124. In the region of disinterest 240, the scanned points can be regularly spaced with a larger spacing than outside of the third region of interest 237. In an example, no points are scanned in the region of disinterest 240. In an example, the region of disinterest can correspond to an area in the frame that includes a quasi-stationary object. The size and location of the region of disinterest 240 can be determined based on the identification of one or more objects within the second frame 231. Similar to the regions of interest 235-237, the region of disinterest 240 can be dynamically adjusted on a frame-to-frame basis. In an example where the third region of interest 236 can be the same size as the second region of interest 235, a total number of scanned points in the third frame 232 can be smaller than the number of scanned points in the second frame 231. In the example shown in FIG. 2C, the third frame can accommodate up to 144 scanned points, the third region of interest 237 can include 12 scanned points, the region of disinterest 240 can exclude up to 20 scanned points, and the portion of the frame outside of the region of interest can include 18 scanned points, for a total of 30 scanned points out of a total of 144 possible scanned points.

Figure 3A:
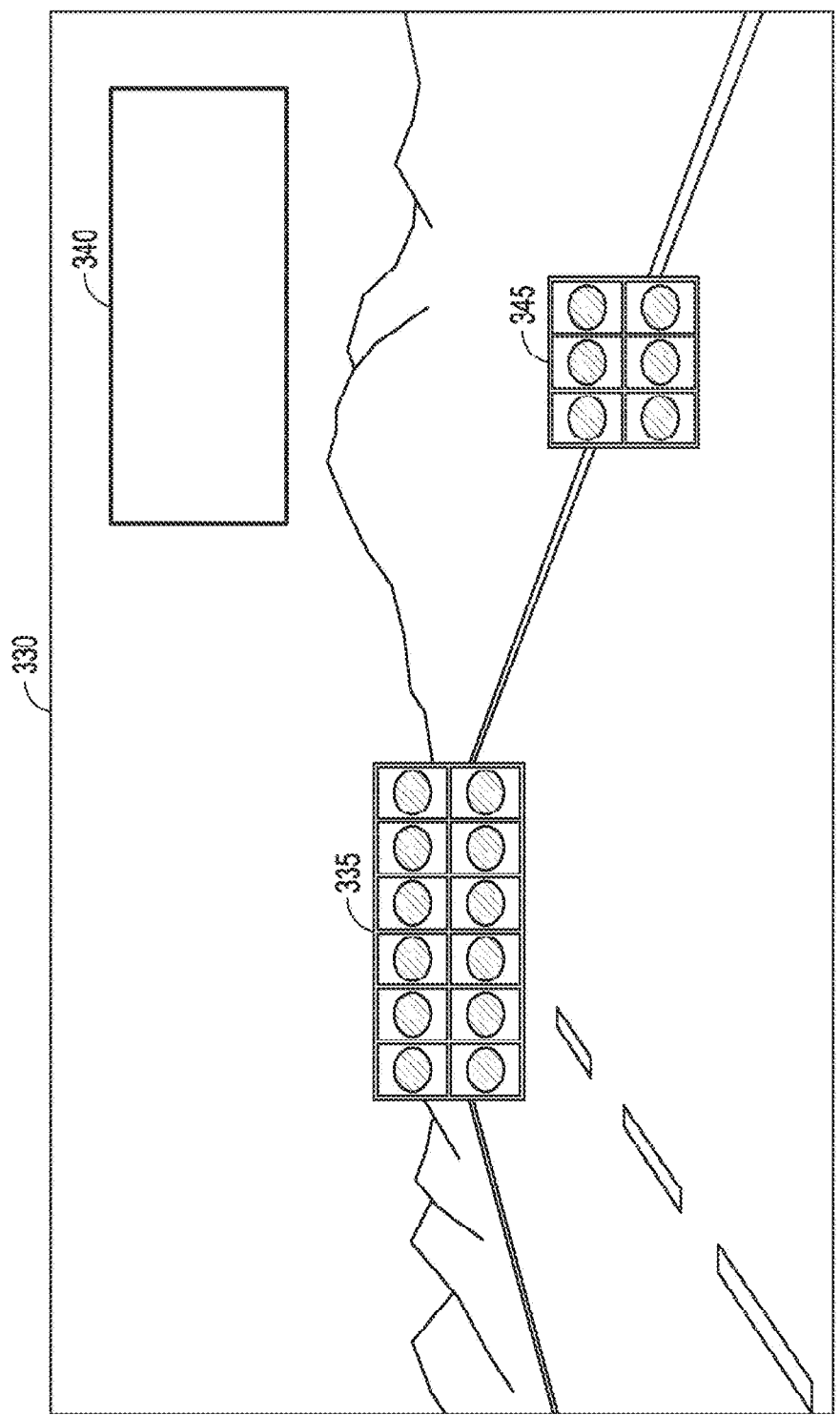
FIGS. 3A-3B illustrate an example of a sequence of frames in a lidar system.
Figure 3B:
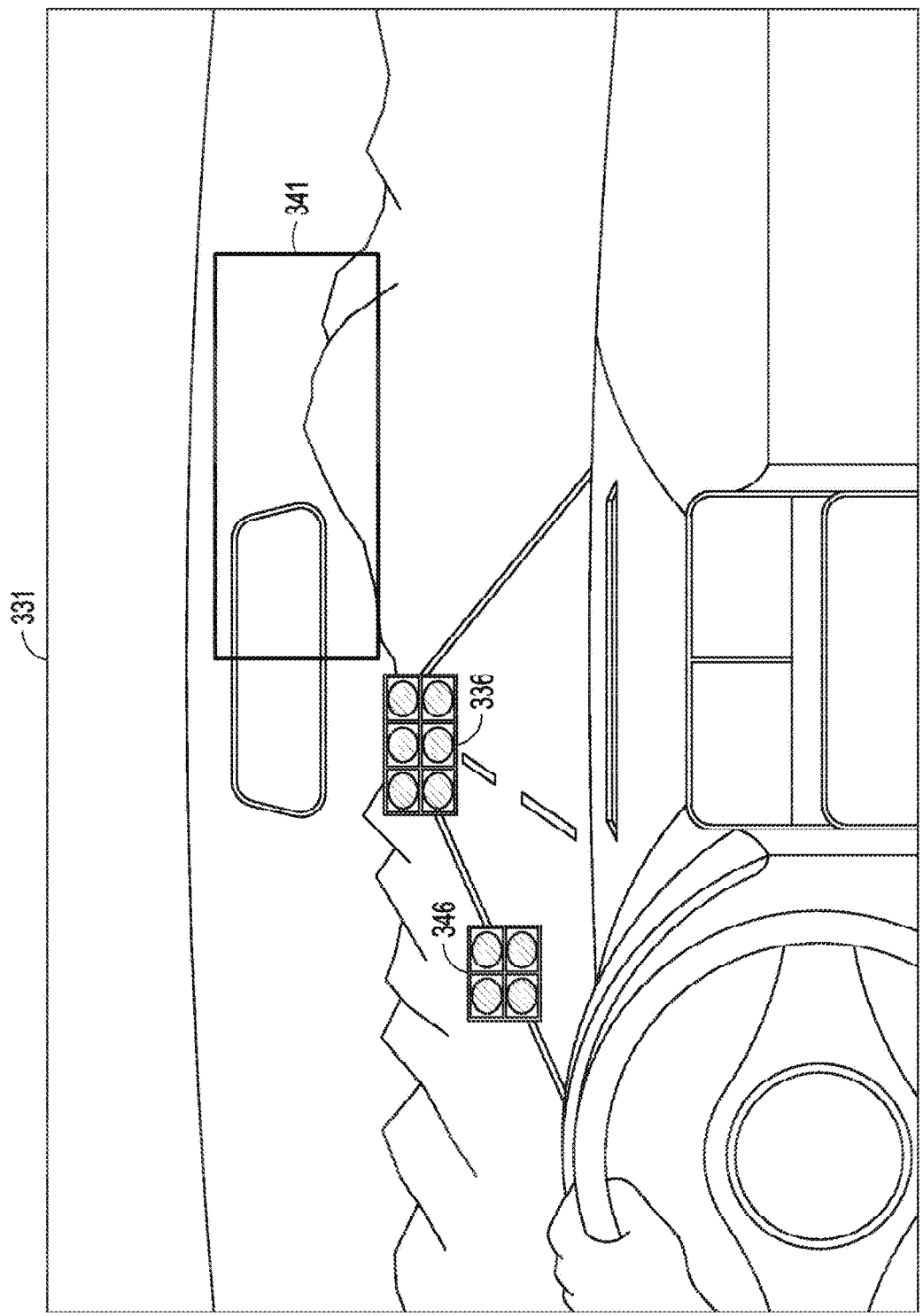

FIGS. 3A-3B illustrate a sequence of frames 330-331, such as can be collected by a lidar system in an automobile where the scanned points can be irregularly spaced across a field of view that can include a road and associated landscape. The first frame 330 as illustrated in FIG. 3A can include a first region of interest 335, a second region of interest 345, and a region of disinterest 340. The first region of interest 335 can include a collection of regularly spaced scanned points. The scanned points in the first region of interest 335 can correspond to a first angular resolution. The first region of interest 335 can correspond to a portion of a road having at least one lane, where each lane can be approximately 4 meters wide. A width of the first region of interest 335 can be selected, such as to accommodate the width of three lanes (e.g., a lane that an automobile is driving in and additionally, one lane on either side of the lane that the automobile is driving in). The width of the first region of interest 335 can be sized to accommodate a radius of curvature of the road. For example, at a relatively high speed of 150 km/hr, a radius of curvature of the road can be approximately 1 km, corresponding to a road that can be 4° off of a longitudinal axis at a distance of 150 m. At a medium speed of 80 km/hr, a radius of curvature of the road can be approximately 200 m, corresponding to a road that can be 10° off of a longitudinal axis at a distance of 60 m. To account for the radius of curvature of the road, the first region of interest 335 can extend 20° in a horizontal direction, and to account for a vertical extent of other automobiles (e.g. an automobile can extend 4 m and the region of interest can be sized to accommodate twice the vehicle height at a distance of 60 m), the first region of interest can extend 4° in a vertical direction. The second region of interest 345 can be smaller than the first region of interest 335 and can include a collection of regularly spaced scanned points. The scanned points in the second region of interest 345 can correspond to the first angular resolution. The second region of interest 345 can correspond to a portion of a lane marker on a road. Outside of the first region of interest 335 and the second region of interest 345, the scanned points can be regularly spaced with a larger spacing than the first region of interest 335 and the second region of interest 345, corresponding to a coarser angular resolution than in the first region of interest 335 or the second region of interest 345. Outside of the first region of interest 335 and the second region of interest 345, every $m^{th}$ column in every $n^{th}$ row can be scanned with the exception of the region of disinterest 340. The region of disinterest 340 can designate an area within the frame 330 where the scanned points can be regularly spaced with a larger spacing than in the first region of interest 335, the second region of interest 345, or the region outside of the first region of interest 335 and the second region of interest 345. In an example, no points are scanned within the region of disinterest 340. The region of disinterest 340 can include fixed road infrastructure, such as guard rails and the road shoulder. The region of disinterest can include a road surface near an automobile. The region of disinterest 340 can correspond to objects such as trees, rocks, or mountains within a field of view of a lidar system, such as lidar system 100. The first region of interest 335, the second region of interest 345, and the region of disinterest 340 can be adjusted dynamically, such as based on the motion of objects within the field of view of the lidar system 100. FIG. 3B illustrates a second frame 331 where the regions of interest and disinterest have been dynamically updated, such as based on a change in the relative position of the road and lane markers within the field of view of the lidar system 100. The second frame 331 as illustrated in FIG. 3b can include a first region of interest 336, a second region of interest 346, and a region of disinterest 341. The first region of interest 336 can include a collection of regularly spaced scanned points. The scanned points in the first region of interest 335 can correspond to a first angular resolution. The first region of interest 335 can correspond to a portion of a road having at least one lane, where each lane can be approximately 4 meters wide. A width of the first region of interest 335 can be selected, such as to accommodate the width of three lanes (e.g., a lane that an automobile is driving in and additionally, one lane on either side of the lane that the automobile is driving in). The width of the first region of interest 335 can be sized to accommodate a radius of curvature of the road. For example, at a relatively high speed of 150 km/hr, a radius of curvature of the road can be approximately 1 km, corresponding to a road that can be 4° off of a longitudinal axis at a distance of 150 m. At a medium speed of 80 km/hr, a radius of curvature of the road can be approximately 200 m, corresponding to a road that can be 10° off of a longitudinal axis at a distance of 60 m. To account for the radius of curvature of the road, the first region of interest 335 can extend 20° in a horizontal direction, and to account for a vertical extent of other automobiles (e.g. an automobile can extend 4 m and the region of interest can be sized to accommodate twice the vehicle height at a distance of 60 m), the first region of interest can extend 4° in a vertical direction. The second region of interest 346 can be smaller than the first region of interest 336 and can include a collection of regularly spaced scanned points. The scanned points in the second region of interest 346 can correspond to the first angular resolution. The second region of interest 346 can correspond to a portion of a lane marker on a road. Outside of the first region of interest 336 and the second region of interest 346, the scanned points can be regularly spaced with a larger spacing than the first region of interest 336 and the second region of interest 346, corresponding to a coarser angular resolution than in the first region of interest 336 or the second region of interest 346. Outside of the first region of interest 336 and the second region of interest 346, every $m^{th}$ column in every $n^{th}$ row can be scanned with the exception of the region of disinterest 341. The region of disinterest 341 can designate an area within the frame 331 where the scanned points can be regularly spaced with a larger spacing than in the first region of interest 336, the second region of interest 346, or the region outside of the first region of interest 336 and the second region of interest 346. In an example, no points are scanned within the region of disinterest 341. The region of disinterest 341 can correspond to objects such as trees, rocks, or mountains within a field of view of a lidar system, such as lidar system 100.

Figure 4:
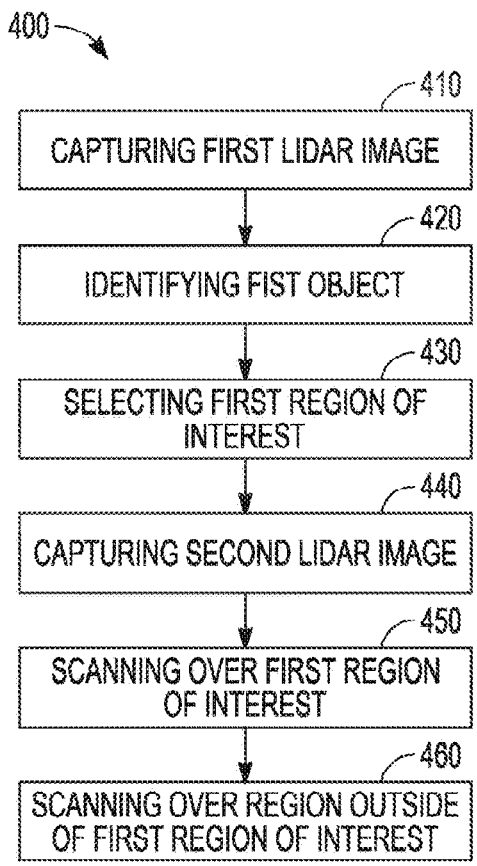
FIGS. 4-5 illustrate a method of operation of a lidar system.

FIG. 4 illustrates a method of adjusting a field of view in a lidar system, such as lidar system 100. A light beam, such as can be emitted by the illuminator 105, can be scanned by the scanning element 106 over a target region within a field of view of an optical system, such as optical system 116 and a first image can be captured by a photosensitive detector, such as the photosensitive detector 120 (step 410). A first object can be identified within the first image by detection circuitry, such as the detection circuitry 124 (step 420). Control circuitry, such as control circuitry 104 can select a first region of interest that includes at least a portion of the identified first object (step 430). A second lidar image can then be captured (step 440). The capturing of the second lidar image can include steps 450 and 460 described below. A light beam, such as can be emitted by the illuminator 105 can be scanned by the scanning element 106 over the first region of interest at a first spatial sampling resolution (step 450). A light beam, such as can be emitted by the illuminator 105 can be scanned by the scanning element 106 over the field of view outside of the first region of interest at a second spatial sampling resolution, wherein the second sampling resolution can be different than the first spatial sampling resolution (step 460). In an example, detection circuitry, such as the detection circuitry 124 can identify a second object outside of the first region of interest in the captured second lidar image. Control circuitry, such as control circuitry 104 can select a second region of interest that can contain at least a portion of the identified second object. A third lidar image can then be captured, where capturing the third lidar image can include scanning a light beam, such as that emitted by the illuminator 105, over both the first and second regions of interest at the first spatial sampling resolution and over a field of view outside of both the first and second regions of interest at a third spatial sampling resolution that can be different than the second spatial sampling resolution. In an example, the control circuitry 104 can receive external data, such as from an inertial sensor, GPS, radar, camera, or wheel speed sensor data, and in response to the received external data, the control circuitry 104 can adjust a size or position of the first region of interest.

The inertial sensor can include an accelerometer to sense linear acceleration of the lidar system and/or a gyroscope to sense an angular rotation rate of the lidar system. The inertial sensor can provide the sensed linear acceleration and/or angular rotation rate to the control circuitry 104 and in response, the control circuitry 104 can adjust a field of view of the lidar system or a region of interest of the lidar system, such as to compensate for pitch, yaw, or dynamic motion of a vehicle to which the lidar system 100 can be mounted or for static misalignment of the lidar system 100 with respect to a vehicle on which the lidar system 100 can be mounted. In an example, the inertial sensor can use gravity to compensate for static mounting errors.

Figure 5:
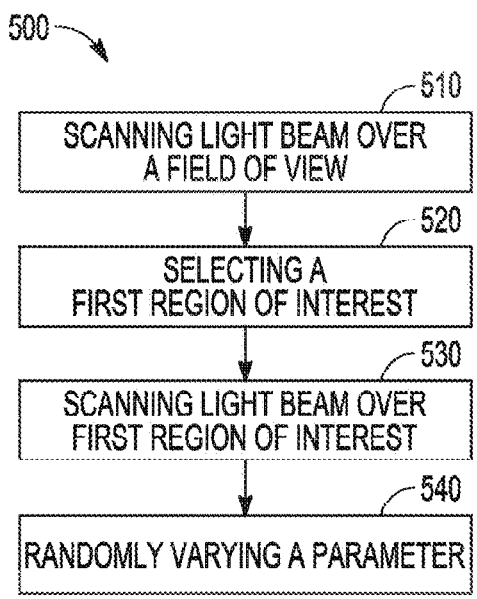

FIG. 5 illustrates a method of providing a dynamic region of interest and reduced interference in a lidar system, such as lidar system 100. A light beam, such as can be emitted by the illuminator 105, can be scanned by the scanning element 106 over a target region within a field of view of an optical system, such as optical system 116 and a first image can be captured by a photosensitive detector, such as the photosensitive detector 120 (step 510). A first object can be identified within the first image by detection circuitry, such as the detection circuitry 124. Control circuitry, such as control circuitry 104 can select a first region of interest that includes at least a portion of the identified first object (step 520). The scanning element 106 can then scan the light beam emitted by the illuminator 105 over the first region of interest to capture a second lidar image (step 530). The control circuitry can vary a parameter associated with capturing of the first or second lidar images (step 540). The varying parameter can provide a signature that can characterize an identity of the lidar system that produced the light beam. The control circuitry can instruct the scanning element 106 to scan the light beam over a region of interest in a random or pseudo-random scan pattern, such as to provide a signature that can identify the lidar system that produced the light beam. The control circuitry can insert a random time delay between successive transmissions of the light beam as the light beam is scanned over a target region, such as to provide a signature that can identify the lidar system that produced the light beam.

The invention claimed is:

1. A method for providing a dynamic region of interest in a lidar system, the method comprising:
   capturing a first lidar image corresponding to a field of view (FOV), the capturing comprising:
   selecting a first subregion of interest in the FOV that is smaller than the FOV;
   performing a first scanning of a light beam emitted by a single laser across the first subregion of interest sequentially across a first collection of regularly spaced pixels corresponding to the first subregion of interest;
   performing a second scanning of the light beam emitted by the single laser within the FOV but outside the first subregion of interest using a first random or pseudo-random spatial scanning pattern across a second collection of regularly spaced pixels, wherein the spatial scanning pattern represents an order in which the pixels are scanned by the light beam, wherein the first random or pseudo-random spatial scanning pattern represents an identity of the lidar system performing the second scanning; and
   in response to detecting an object in the first lidar image corresponding to the FOV, performing a third scanning of the light beam emitted by the single laser to capture a second lidar image, the third scanning being over a selected second subregion of interest, the second subregion of interest being different than the first subregion of interest.

2. The method of claim 1, further comprising:
performing a fourth scanning of the light beam emitted by the single laser within the FOV, outside the second subregion of interest in a second random or pseudo-random spatial scanning pattern and wherein the fourth scanning of the light beam is also outside the first subregion of interest and uses a second random or pseudo-random spatial scanning pattern that is different than the first random or pseudo-random spatial scanning pattern.

3. The method of claim 2, wherein at least one of the first or second random or pseudo-random spatial scanning pattern further comprises a random time delay between successive transmissions of the light beam emitted by the single laser over the FOV.

4. The method of claim 1, wherein a spatial sampling resolution in the first lidar image is different from the spatial sampling resolution of the second lidar image.

5. The method of claim 4, comprising, using the identity, rejecting received light pulses from a target within the FOV that were not issued by the same lidar system.

6. The method of claim 1, further comprising:
using the identity, verifying that received light pulses from a target within the FOV were issued by the same lidar system; and
determining a distance from the lidar system to a target within the FOV based on the verified light pulses.

7. The method of claim 1, further comprising:
using an inertial sensor to provide an indication of an acceleration or a rotation of the lidar system, and using control circuitry to adjust the FOV of the lidar system or the first subregion of interest within the FOV in response to the indication of the acceleration or rotation of the lidar system.

8. The method of claim 7 comprising using the inertial sensor to provide an indication of a change in orientation of the lidar system and using the control circuitry to adjust the FOV of the lidar system or the first subregion of interest within the FOV in response to the indication of the change in orientation of the lidar system.

9. The method of claim 7 comprising using the inertial sensor to provide an indication of static misalignment of the lidar system with a host vehicle and using the control circuitry to adjust the FOV of the lidar system or the first subregion of interest within the FOV in response to the indication of the static misalignment of the lidar system.

10. The method of claim 7 comprising using the inertial sensor to provide an indication of dynamic vehicle motion and using the control circuitry to adjust the FOV of the lidar system or the first subregion of interest within the FOV in response to the indication of the dynamic vehicle motion.

11. The method of claim 1, wherein capturing the second lidar image is at a second angular resolution different than a first angular resolution that the first lidar image is captured at and a second region of interest that corresponds to a different location in the FOV than the first lidar image.

12. A lidar system for providing a dynamic region of interest and reduce interference in a lidar system, the system comprising:
a scanning element configured to capture a first lidar image corresponding to a field of view (FOV); and
control circuitry configured to:
select a first subregion of interest in the FOV that is smaller than the FOV;
perform a first scanning of a light beam emitted by a single laser across the first subregion of interest sequentially across a collection of regularly spaced pixels corresponding to the first subregion of interest;
perform a second scanning of the light beam emitted by the single laser within the FOV but outside the first subregion of interest using a first random or pseudo-random spatial scanning pattern across a second collection of regularly spaced pixels, wherein the first random or pseudo-random spatial scanning pattern represents an identity of the lidar system performing the second scanning; and
in response to detecting an object in the first lidar image corresponding to the FOV, perform a third scanning of the light beam emitted by the single laser to capture a second lidar image, the third scanning being over a selected second subregion of interest, the second subregion of interest being different than the first subregion of interest.

13. The system of claim 12, further configured to:
perform a fourth scanning of the light beam emitted by the single laser within the FOV, outside the second subregion of interest in a second random or pseudo-random spatial scanning pattern and wherein the fourth scanning of the light beam is also outside the first subregion of interest and uses a second random or pseudo-random spatial scanning pattern that is different than the first random or pseudo-random spatial scanning pattern.

14. The system of claim 13, wherein at least one of the first or second random or pseudo-random spatial scanning pattern further comprises a random time delay between successive transmissions of the light beam emitted by the single laser over the FOV.

15. The system of claim 12, wherein a spatial sampling resolution in the first lidar image is different from the spatial sampling resolution of the second lidar image.

16. The system of claim 15, comprising, using the identity, rejecting received light pulses from a target within the FOV that were not issued by the same lidar system.

17. The system of claim 12, further comprising:
using the identity, verifying that received light pulses from a target within the FOV were issued by the same lidar system; and
determining a distance from the lidar system to a target within the FOV based on the verified light pulses.

18. A lidar system for providing a dynamic region of interest and reduce interference in a lidar system, the system comprising:
a means for capturing a first lidar image corresponding to a field of view (FOV), the capturing comprising:
a means for selecting a first subregion of interest in the FOV that is smaller than the FOV;
a means for performing a first scanning of a light beam emitted by a single laser across the first subregion of interest sequentially across a collection of regularly spaced pixels corresponding to the first subregion of interest;
a means for performing a second scanning of the light beam emitted by the single laser within the FOV but outside the first subregion of interest using a first random or pseudo-random spatial scanning pattern across a second collection of regularly spaced pixels, wherein the first random or pseudo-random spatial scanning pattern represents an identity of the lidar system performing the second scanning; and a means for performing a third scanning, in response to detecting an object in the first lidar image corresponding to the FOV, of the light beam emitted by the single laser to capture a second lidar image, the third scanning being over a selected second subregion of interest, the second subregion of interest being different than the first subregion of interest.

19. The system of claim 18, wherein a spatial sampling resolution in the first lidar image is different from the spatial sampling resolution of the second lidar image.

20. The system of claim 18, wherein the first random or pseudo-random spatial scanning pattern further comprises a random time delay between successive transmissions of the light beam emitted by the single laser over the FOV.

* * * * *